United States Patent
Malik (10) Patent No.: US 9,247,520 B2
(45) Date of Patent: Jan. 26, 2016

(54) DETERMINING AND DISPLAYING INFORMATION RELATING TO CROWDEDNESS OF VENUE AMENITIES

(71) Applicant: VenueNext, Inc., Palo Alto, CA (US)

(72) Inventor: Kunaldeep Malik, Palo Alto, CA (US)

(73) Assignee: VenueNext, Inc., Palo Alto, CA (US)

( * ) Notice: Subject to any disclaimer, the term of this patent is extended or adjusted under 35 U.S.C. 154(b) by 0 days.

(21) Appl. No.: 14/466,862

(22) Filed: Aug. 22, 2014

(65) Prior Publication Data

US 2015/0057025 A1    Feb. 26, 2015

Related U.S. Application Data

(60) Provisional application No. 61/870,184, filed on Aug. 26, 2013.

(51) Int. Cl.
*H04W 4/24* (2009.01)
*H04W 64/00* (2009.01)
*H04W 4/02* (2009.01)

(52) U.S. Cl.
CPC ............ *H04W 64/00* (2013.01); *H04W 4/023* (2013.01)

(58) Field of Classification Search
CPC .......... H04W 4/02; H04W 4/26; H04W 64/00
USPC ...................................... 455/456.3
See application file for complete search history.

(56) References Cited

U.S. PATENT DOCUMENTS

| 7,409,221 B2 * | 8/2008 | Obradovich et al. ......... 455/457 |
| 2012/0215911 A1 * | 8/2012 | Raleigh et al. ................ 709/224 |
| 2015/0018011 A1 * | 1/2015 | Mendelson ................ 455/456.3 |

* cited by examiner

*Primary Examiner* — Qutbuddin Ghulamali
(74) *Attorney, Agent, or Firm* — Hickman Palermo; Becker Bingham LLP (57) ABSTRACT

Amenity service point data is stored, where the amenity service point data specifies, for a plurality of amenities in a venue, a respective plurality of different geographic points at which the amenities are located within the venue. Locations of a plurality of mobile computing devices that are within the venue are determined. For each particular amenity among the plurality of amenities, a crowdedness level of the particular amenity is determined based in part on the locations of the plurality of mobile computing devices relative to the geographic point corresponding to the particular amenity. A request to view information relating to a certain amenity is received. Particular information relating to the certain amenity, where the information includes an indication of the crowdedness level of the certain amenity is caused to display. The crowdedness level of the certain amenity is periodically re-determined during duration of an event at the venue.

20 Claims, 5 Drawing Sheets

DETERMINING AND DISPLAYING INFORMATION RELATING TO CROWDEDNESS OF VENUE AMENITIES

CROSS-REFERENCE TO RELATED APPLICATIONS; BENEFIT CLAIM

This application claims the benefit of provisional application 61/870,184 filed Aug. 26, 2013, the entire contents of which are hereby incorporated by reference for all purposes as if fully set forth herein.

TECHNICAL FIELD

The present disclosure relates to management of one or more amenities in a venue and displaying information relating to the amenities including indications of crowdedness.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Large venues, such as sports stadiums or shopping malls, often have amenities located at different places throughout the venue. For example, a football stadium may have ten different food vendors spread out throughout the stadium. A shopping mall may have five different restrooms spread out throughout the mall. Different amenities of the same type may offer different goods or services. For example, the ten different food vendors in the stadium may each serve different food.

In some cases, the attention of a visitor to the venue is focused on an occurring in the venue or task being performed in the venue separate from the enjoyment of an amenity. For example, a football fan may come to a football stadium primarily to enjoy a football game. A visitor at a mall may be focused on purchasing a specific item.

The visitor may wish to use the amenity as efficiently as possible so there is minimal distraction from the event being viewed or task being performed. For example, a football fan at a football stadium may wish to obtain his food quickly so that he does not miss an important play in the football game. Techniques for providing information to a visitor that enables the user to select and use the amenities in a venue as efficiently as possible are needed.

SUMMARY OF THE INVENTION

The appended claims may serve as a summary of the invention.

DETAILED DESCRIPTION

Techniques for determining and displaying information relating to crowdedness of venue amenities are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Example Process for Determining and Displaying Amenity Crowdedness Information
4.0 Example Graphical Interface for Displaying Crowdedness Information
5.0 Implementation Mechanisms—Hardware Overview
6.0 Extensions and Alternatives

1.0 General Overview

Determining and displaying information relating to crowdedness of venue amenities is described. A central server may collect location data from a plurality of mobile computing devices throughout the venue. The server may determine crowdedness levels of a plurality of amenities within a venue by comparing the locations of the mobile computing devices with the locations of the plurality of amenities. The crowd assessment unit may determine which amenity, if any, the plurality of mobile computing devices are near. The crowd assessment unit may assign crowdedness levels to one or more amenities based in part on how many mobile computing devices are determined to be near the amenity. Information relating to at least one amenity may be displayed at a mobile computing device of a user, where the information includes an indication of the crowdedness of the amenity.

The crowdedness information for one or more amenities may be displayed in association with other information relating to the amenities. A user may select a particular amenity to visit or whether to visit any amenity at all based on the crowdedness level(s) associated with one or more amenities. For example, if a user is interested in the food being offered by two different food vendors at a venue and determines that one vendor is more crowded than another vendor, the user may visit the less crowded venue. Viewing such information beforehand would save the additional time that the user may have otherwise spent waiting at the crowded food vendor or relocating from the crowded vendor to the less crowded vendor. In some cases, a user may determine that all the amenities he is interested in are too crowded and may decide to wait until a later time to visit any amenity.

2.0 Structural and Functional Overview

Figure 1:
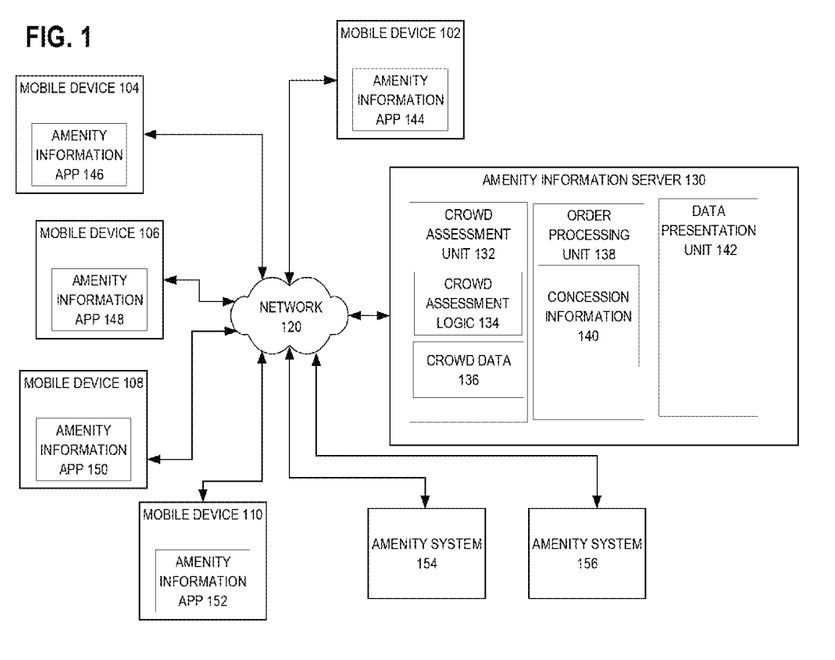
FIG. 1 illustrates an example networked computer system configured to determine amenity information, such as crowdedness levels for one or more amenities, and display amenity information at an ordering device.

FIG. 1 illustrates an example networked computer system configured to determine amenity information, such as crowdedness levels for one or more amenities, and display amenity information at an ordering device.

Amenity information server 130 may comprise a computer that is configured to collect location information from a plurality of mobile computing devices distributed throughout a venue including mobile computing device 102, 104, 106, 108, 110. Amenity information applications 144, 146, 148, 150, 152 may comprise computer programs, other software elements or other logic that are configured to execute on mobile computing devices and to collect and deliver the location information to amenity information server 130 via network 120. Mobile devices 102, 104, 106, 108, 110 may be any of a mobile phone, tablet computer, laptop, or other mobile computing device. For purposes of illustrating a clear example, FIG. 1 illustrates a limited number of amenity information applications and mobile devices, but in practice there may be any number of applications and devices consistent with the capability of server 130 to process data and interoperate with the applications. For example, an embodiment may be configured to operate with thousands of mobile devices at a large-capacity stadium.

Amenity information applications 144, 146, 148, 150, 152 may receive amenity information from amenity information server 130 via network 120 and may cause display of the amenity information at mobile computing devices 104, 106, 108, 110. Amenity information applications 146, 148, 150, 152 may be provided by the management of the venue that contains the amenities or another entity affiliated with the venue, or by third parties. Typically users of the mobile computing devices obtain a copy of the amenity information application before or at the time of attending an event at a venue; for example, a user may download a copy of the amenity information application to the user's mobile computing device before arriving at the venue, after arrival or during an event. The amenity information applications may also display other information relating to the amenities in the venue and/or information relating to event(s) occurring at the venue. For example, the venue may be a football stadium and the amenity information application may be provided by an entity associated with the team for which the stadium is home. The amenity information application may show other details relating to the football game such as the current score and player information; thus, the amenity information application may be integrated into a larger application or set of applications that provide other data or perform other functions relating to an event at the venue.

Crowd assessment unit 132 may determine the crowdedness of one or more amenities within the venue based on the received location information and according to crowd assessment logic 134. The determined crowdedness information, such as crowdedness levels assigned to one or more amenities, may be stored as crowd data 136 at amenity information server 130.

The amenity information displayed by amenity information applications 146, 148, 150, 152 may include indicators of crowdedness of various amenities. "Crowdedness," in this context, means a number, percentage, level or other metric reflecting a number of people in a queue to use an amenity or a number of potential customers within a service area near the amenity, or other values that are useful to determine how rapidly an amenity is likely to be able to serve a new patron, customer or other user. In some embodiments, one or more of the amenities are food providers that provide concessions such as food and drinks. In another embodiment, an amenity may be a gift shop that sells merchandise. A user may browse the items offered by one or more amenities using amenity information applications 146, 148, 150, 152 including, but not limited to, food or drink items offered by a food provider or items for sale at a gift shop. A user may also place order with one or more amenities using amenity information applications 146, 148, 150, 152, such as orders for food, beverages, or other items.

Amenity information server 130 as shown in FIG. 1 broadly represents one or more computers, virtual machine instances, clusters, or other computing resources that are configured to perform the functions described herein. Amenity information server 130 may comprise data presentation unit 142 which may send the amenity information to one or more of amenity information applications 146, 148, 150, 152 and may cause the amenity information to be displayed upon one or more of mobile computing devices 104, 106, 108, 110.

Order processing unit 138 may be capable of receiving and processing orders for items from the amenities. Order processing unit 137 may comprise information about the items available for ordering such as concession information 140. Amenity information server 130 may receive updates from different amenity systems within the venues, such as amenity system 154, 156. Amenity systems 154, 156 each may be associated with a different amenity operated by different amenity operators.

Amenity systems 154, 156 may be computing devices at the location of the corresponding amenities. The updates from the amenity systems may indicate changes in item inventory such as changes in which concession items are available for purchase. Order processing unit 138 may determine order confirmation information or order pickup information and data presentation unit 142 may cause the order confirmation or pickup information to be displayed at the ordering mobile computing device of mobile computing devices 102, 104, 106, 108, 110. In response to processing an order from a mobile computing device, order processing unit 138 may also send information relating to the order to the system of the amenity associated with the order, such as amenity system 154 or 156.

Figure 2:
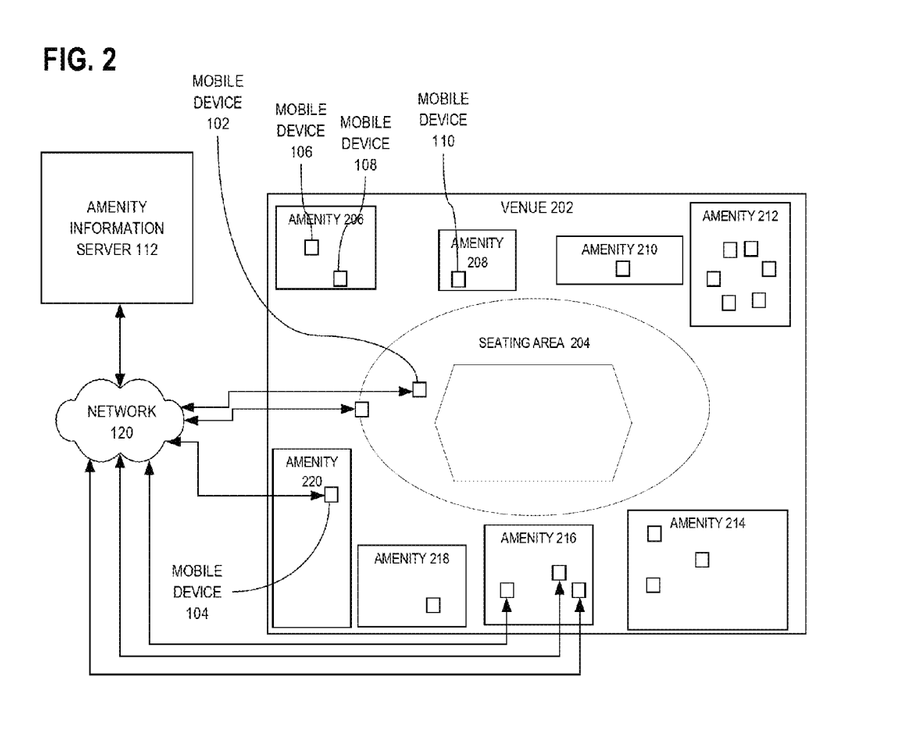
FIG. 2 illustrates an example configuration of mobile computing devices relative to a venue.

FIG. 2 illustrates an example configuration of mobile computing devices relative to a venue. Venue 202 may be any venue containing amenities. For example, venue 202 may be a stadium, arena, field, or other physical facility or location at which a sporting event is held. In other embodiments, venue 202 may be a shopping facility such as shopping mall, an airport, or an arcade center. Venue 202 may be a large region with multiple amenities of the same type located in different locations throughout the venue. For example, venue 202 may include a plurality of different restaurants in the venue, a plurality of different restrooms within the venue, and/or a plurality of different stores within the venue.

Amenities 206, 208, 210, 212, 214, 216, 218, 220 may be amenities of the same type. For example, 206, 208, 210, 212, 214, 216, 218, 220 may be restaurants. In another embodiment, the amenities may be of different types. For example, some of the amenities may be stores, other amenities may be restaurants, and other amenities may be restrooms. By receiving communications from various mobile computing devices within venue 202, such as mobile computing device 102, 104, 106, 108, 110, amenity information server 130 may determine the locations of the mobile computing devices and may determine which amenities, if any, the mobile computing devices are near. Crowd assessment unit 132 may store or access amenity location information that specifies the geographic points at which amenities in the venue are located.

Crowd assessment unit 132 may comprise location information for a plurality of wireless access points and may determine the location of one or more mobile computing devices by determining which wireless access points the mobile computing devices are near.

Other examples of amenities whose crowdedness may be evaluated by amenity information server 130 include restrooms and banking facilities such as automated teller machines (ATMs). Other embodiments may be implemented for any facility that serves a population of users or customers.

Network 120 broadly represents one or more local area networks, wide area networks, internetworks or a combination thereof. Network 120 may be a public network such as the internet or may be a private network designed to facilitate faster transfer of information between mobile computing devices in the venue and amenity information server 120, or a combination of networks and internetworks.

In one embodiment, venue 202 is configured with a plurality of wireless access points and internetworking equipment to couple amenity information server 130 to mobile computing devices in the venue such as mobile computing devices 102, 104, 106, 108, 110 using wireless links. In one embodiment, venue 102 comprises in excess of 50,000 seats in seating region 204 and wireless access points are positioned near the seats using approximately one wireless access point per 100 seats. Wireless access points may also be positioned outside seating region 204 near the amenities. The wireless access points are coupled by wired links to routers, switches and other elements of internetworking infrastructure that are coupled to amenity information server 130 and that implement a high-speed, high-capacity local network or set of networks for servicing mobile computing devices 102, 104, 106, 108, 110. The bandwidth and processing capacity of amenity information server 130 and the networking infrastructure are configured to accommodate a large number of simultaneous connections of amenity information server 130, or a computing cluster in which the amenity information server is located, to a large number of mobile computing devices. For example, in one embodiment the infrastructure may accommodate in excess of 50,000 simultaneous requests for amenity information to amenity information server 130 to allow each of the mobile computing devices to view amenity information enabling a user to select an amenity and/or place an order for an item from an amenity.

Figure 3:
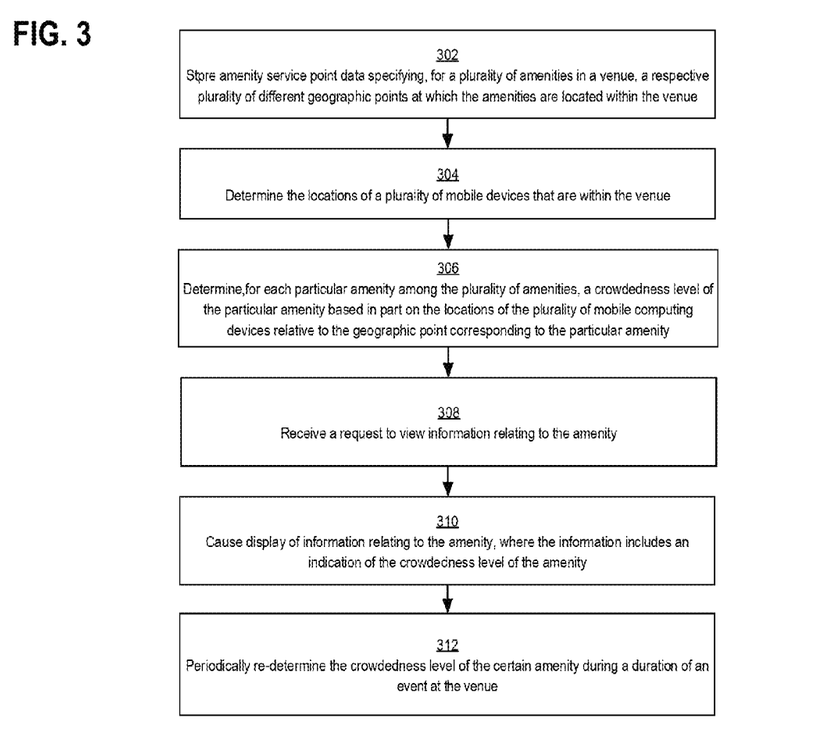
FIG. 3 illustrates an example process for determining crowdedness of venue amenities and displaying information relating to an amenity including an indication of the crowdedness of the amenity.

3.0 Example Process for Determining and Displaying Amenity Crowdedness Information FIG. 3 illustrates an example process for determining crowdedness of venue amenities and displaying information relating to an amenity including an indication of the crowdedness of the amenity. The process of FIG. 3 may be performed at amenity information server 130 and may be implemented using a special-purpose computer, one or more computer programs that are executed using a general-purpose computer, or other functional logic.

At block 302, amenity information server 130 stores amenity service point data specifying, for a plurality of amenities in a venue, a respective plurality of different geographic points at which the amenities are located within the venue. For example, the amenity service point data may comprise latitude-longitude values, at any level of resolution, for a center point or customer entry point for each of the amenities. At block 304, amenity information server 130 determines the locations of a plurality of mobile computing devices that are within the venue. For example, amenity information server 130 may obtain location data from mobile computing devices as devices become associated to the wireless access points that are distributed throughout the venue; the wireless access points may be configured with appropriate program code to publish, to an access server or other computing device, an event announcing the association of a new mobile computing device to a specified access point. In response, the access server may update the amenity information server 130 with the location data.

Additionally or alternatively, amenity information applications executing on the mobile computing devices may automatically update amenity information server 130 with the location of the mobile computing device. The amenity information applications may send the location updates periodically or in response to detecting the occurrence of a certain location change event, such as upon detecting that the mobile computing device's location has changed more than a particular amount of distance since the last update or upon detecting that the location of the mobile computing device has changed to be outside seating region 204 since the last update.

In an embodiment, an amenity information application such as amenity information app 142 determines the current location of a mobile computing device such as mobile computing device 102 by determining which Wi-Fi networks or access point is nearest to the mobile computing device. The amenity information application may determine this based on the signal strength of the nearby Wi-Fi networks or access points.

In an embodiment, each of a plurality of access points in the venue is associated with at least one particular amenity. For example, a particular access point may be associated, in a database, with a particular amenity based on proximity, as indicated by a comparison of access point location data that indicates a latitude-longitude of the access point and the amenity service point data. Alternatively, a particular access point may be associated with a particular amenity based on the strength of radio signals emitted by the access point and detected at an antenna near the amenity. Amenity information server 130 may determine the crowdedness of an amenity at a given time by determining the count of mobile computing devices that are associated to each access point that is considered to be associated with the amenity.

Amenity information server 130 may determine a mapping for each mobile computing device whose location is detected. A mapping may identify the mobile computing device and a particular wireless access point from among a set of a wireless access points. An amenity information application may determine which wireless access point in a set of wireless access points is closest to a mobile computing device. The amenity information application may identify the closest access point by identifying the wireless access points out of the set of wireless access points that provides the strongest signal. The amenity information application may also determine a minimum signal strength value and may ensure that the signal from the wireless access point is greater than the identified minimal signal strength. Amenity information server 130 may associate the device identifier of a mobile computing device with the identifier of a particular wireless access point based on a determination that the access point is sufficiently near the mobile computing device and is the closest access point to the mobile computing device out of a set of wireless access points.

In another embodiment, amenity information app 142 utilizes global positioning system (GPS) technology and determines the current location of a mobile computing device 102 based on a signal received from a GPS satellite.

At block 306, amenity information server 130 determines, for each particular amenity among the plurality of amenities, a crowdedness level of the particular amenity based in part on the locations of the plurality of mobile computing devices relative to the geographic point corresponding to the particular amenity. Crowd assessment logic may indicate a threshold distance amount. If the distance between the mobile computing device and the geographic point corresponding to the amenity is less than the threshold distance amount, the mobile computing device may be determined to be sufficiently near to the amenity for purposes of calculating the amenity's crowdedness.

There may be a maximum and/or minimum number of people or a maximum and/or minimum amount of density that corresponds to each crowdedness level. For example, crowd assessment logic 134 may indicate that a particular crowdedness level is associated with a minimum density of one (1) person per twenty (20) square feet and a maximum density of one (1) person per five (5) square feet. Crowd assessment unit 132 may determine a crowdedness level corresponding to an amenity based on the threshold density levels and the amount of area occupied by the amenity. This approach enables discriminating among crowdedness levels based upon amenity size when population is constant; for example, having a hundred mobile computing devices near to a larger-sized amenity may not represent crowdedness, whereas having the same hundred mobile computing devices at a small amenity may indicate significant crowdedness.

As another example, crowd assessment logic 134 may indicate that the minimum number of devices associated with a particular crowdedness level is five and the maximum number of devices associated with the particular crowdedness level is ten. Crowd assessment unit 132 may determine that a crowdedness level corresponds to an amenity based on a determination that the number of mobile computing devices located near the amenity is within the maximum and minimum threshold numbers associated with a crowdedness level.

In other embodiments, a crowdedness level corresponding to an amenity may be determined based at least in part on other information relating to the amenities, such as the number of staff members or customer service representatives associated with an amenity. For example, a minimum threshold value associated with an amenity may be five customers for every staff member at the amenity. A stored database table may indicate, for each amenity, a then-current number of staff members for the amenity. For example, the stored database table may indicate that the number of mobile computing devices detected near the amenity must be at least five times the number of staff members associated with the amenity. The number of staff associated with an amenity may represent the number of people currently working at the amenity or expected to work there. Amenity systems 154, 156 may send updates when a staff member begins or ends a shift at the amenity, which may cause crowd assessment unit 132 to update the staff number associated with the amenity. In other embodiments, the staff number may be adjusted less frequently. For example, the staff number may be adjusted only when a staff member's employment with an amenity begins or ends, which may be on a monthly or a yearly basis.

In yet another embodiment, the determination of the crowdedness level that corresponds to an amenity may be based at least in part on a service speed associated with the amenity. Certain amenities may be faster at providing service than other amenities. For example, a food stand that serves made-to-order food may be associated with a service speed value of "1", indicating that service at the made-to-order food stand is relatively slow. Another food stand that serves pre-made food may be associated with a service speed value of "2", indicating that the service at the pre-made food stand is relatively fast. Crowd assessment unit 132 may determine the crowdedness level corresponding to an amenity by dividing the number of mobile computing devices determined to be near the amenity by the service speed associated with the amenity. The resulting value may be compared with the threshold values associated with one or more crowdedness levels.

In some embodiments, any two or more of the foregoing approaches for determining crowdedness according to different factors may be determined concurrently and blended using a blending function in which one or more of the crowdedness factors are weighted using different weight values.

An approach for determining crowdedness levels that is based in part on one or more of the above information about the amenities may result in a useful determination of a crowdedness level. For example, a user may be most interested in minimizing the amount of time she has to spend waiting in a line to a use a restroom. If a first restroom has a few more people near the restroom than a second restroom but is double the size of the second restroom, the user may prefer to visit the first restroom despite the greater number of people near the restroom since the second restroom would likely have a shorter line due to its greater size. In the case of food and beverage amenities, the use of the approaches herein may result in more efficient processing of orders and increased revenue by resulting in balancing, over time, the number of customers who visit each amenity, so that each amenity operates with an optimum number of customers rather than having one amenity that is over-crowded and another that is under-utilized.

In an embodiment, the crowdedness level corresponding to an amenity is determined based on the crowdedness of the amenity relative to other amenities in the same venue. The threshold values corresponding to crowdedness levels may be updated periodically based on how crowded the amenities in the venue are. For example, the maximum number of mobile computing devices associated with a crowdedness level may be lowered when a fewer number of mobile computing devices are located near any of the amenities. As another example, an amenity may be determined to be associated with crowdedness level of "empty," based on a determination that the amenity is in the bottom third of other amenities of the same type based on the number of mobile computing devices detected near the amenity.

The approach of determining threshold values for the crowdedness levels based on the crowdedness of the amenities in general may be useful in some embodiments. The crowdedness of the amenities as group may increase or decrease depending on the time or other factors such as weather. With fixed threshold numbers, the displayed crowdedness level may be the same for each of the amenities and thus may not be helpful to a user in selecting an amenity. By allowing the threshold numbers to change periodically during an event based on how crowded the amenities as a group are, the set of amenities may be associated with a variety of different crowdedness levels at any given time. The variation in crowdedness levels assigned to the amenities may be more useful to a user selecting between different amenities.

In other embodiments, the threshold values associated with crowdedness levels may be fixed and may not change based on how crowded the amenities in general are. There may be some advantages to having the thresholds for crowdedness fixed throughout an event. This approach may be useful in helping a user to select an optimal to visit an amenity. For example, a user may view the crowdedness level for an amenity at multiple times during a sporting event and may select a particular time to visit an amenity in response to determining that the amenity is relatively empty at that time compared to other times during the sporting event.

At block 308, amenity information server 130 receives a request to view information relating to the amenity. At block 310, amenity information server 130 causes display of information relating to the amenity, where the information includes an indication of the crowdedness level of the amenity.

At block 312, amenity information server 130 periodically re-determines the crowdedness level of the certain amenity during a duration of an event at the venue. The event may be a sporting event such as a football game, a musical concert, or some other show. The updates may occur at certain time increments throughout the event, such as after every ten minutes. In some embodiments, crowdedness levels may be re-determined at key points of the event. For example, amenity information server 130 may automatically re-determine the crowdedness of the amenities two minutes after half-time in a football game has begun. In other embodiments, the update may be linked to other events such as the intermission of a show or some other suspension or resumption of action in the event.

4.0 Example Graphical Interface for Displaying Crowdedness Information

Figure 4:
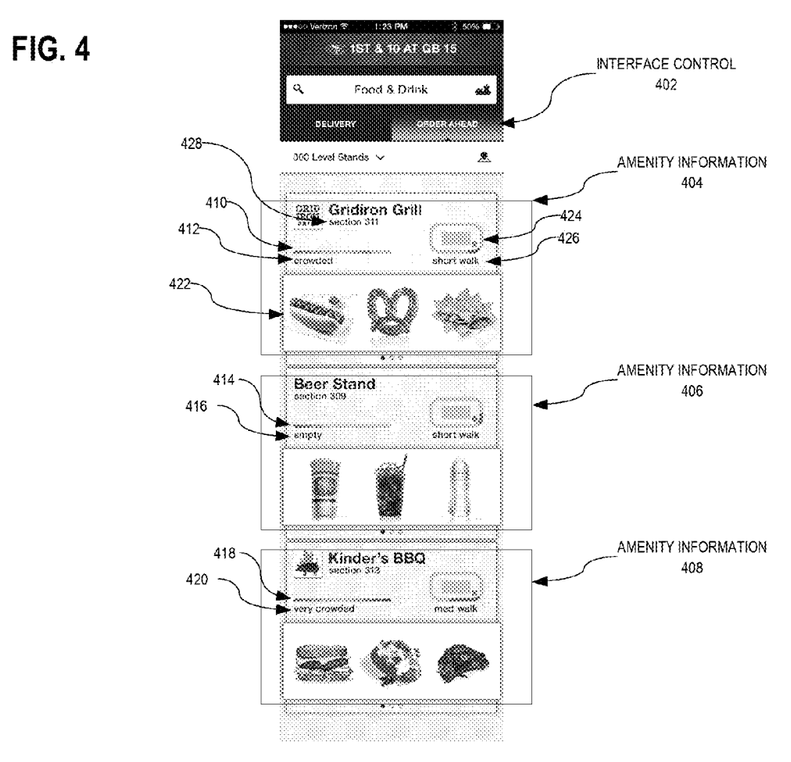
FIG. 4 illustrates an example graphical interface that displays information relating to a plurality of amenities including indications of crowdedness of the amenities.

FIG. 4 illustrates an example graphical interface that displays information relating to a plurality of amenities. The example graphical interface of FIG. 4 may be displayed at mobile computing device 102. Amenity information app 144 may request the amenity information for one or more amenities in response to a user selecting interface control 402, titled "ORDER AHEAD." In response to receiving a user selection of interface control 402, amenity information app 144 may request amenity information for all food providers that allow users to order ahead.

Amenity information 404, 406, 408 may comprise information received from amenity information server 130. Amenity information 404 includes information about the Gridiron Grill restaurant in venue 202. Crowdedness indicator 410 indicates the level of crowdedness of the Gridiron Grill food vendor by displaying a pale red color and crowdedness indicator 412 indicates the level of the Gridiron Grill food vendor by displaying the tag "crowded."

In the illustrated embodiment, crowd assessment unit 132 of amenity information server 130 may assign a particular crowdedness level from the levels of "empty," "crowded," or "very crowded" to an amenity based on the location information received from the plurality of mobile computing devices. In other embodiments, there may be more or less levels of crowdedness.

Amenity information 406 includes information about the Beer Stand drink vendor in venue 202. Crowdedness indicator 414 indicates the level of crowdedness of the Beer Stand drink vendor by displaying a green color and crowdedness indicator 416 indicates the level of the Beer Stand drink vendor by displaying the tag "empty."

Amenity information 408 includes information about the Kinder's BBQ food vendor in venue 202. Crowdedness indicator 418 indicates the level of crowdedness of the Kinder's BBQ food vendor by displaying a dark red color and crowdedness indicator 420 indicates the level of the Kinder's BBQ food vendor by displaying the tag "very crowded."

In other embodiments, crowdedness information may be indicated in other ways. For example, one crowdedness indicator may be a symbol depicting three people, which may indicate that the corresponding amenity is very crowded and another crowdedness indicator may be a symbol depicting one person, which may indicate that the corresponding amenity is empty.

Amenity information 404, 406, 408 also include images of the various menu items offered by the corresponding amenity. For example, menu item images 422 depict a hot dog, pretzel, and nachos, each of which a user may purchase from Gridiron Grill. Displaying items available for purchase from an amenity in association with an indicator of the crowdedness of the amenity for each of a plurality of amenities may allow a user to easily consider both the crowdedness of the amenity and the nature of items available for purchase at an amenity when selecting an amenity. For example, the user may eliminate from consideration the food vendors that are associated with crowdedness levels of "very crowded" and may select the food vendors whose food appears the most appetizing from the remaining vendors.

Amenity information 404, 406, 408 may also indicate the locations of the corresponding amenity. For example, map 422 is a graphical depiction of a map of venue 202 in which the location of Gridiron Grill is emphasized. The dot in map 424 represents the location of the mobile computing device upon which the graphical interface is displayed and the line in map 422 represents the shortest path from the user to Gridiron Grill. Distance indicator 426 reads "short walk," which indicates that Gridiron Grill is relatively close to the user. Location indicator 428 reads "section 311," which indicates that section 311 is the closest section to Gridiron Grill.

In other embodiments, the location of the corresponding amenity may be indicated in a different way. For example, the amenity information may include an arrow indicating the direction of the amenity and a numerical value indicating the distance of the amenity from the current location of the mobile computing device.

In some embodiments, the ordering and/or selection of amenity information for display may be based on the distance of the amenities from the user, crowdedness of the amenities, or both. Amenity information server 120 may comprise location information for each of the vendors. In response to receiving a user request to view all food or beverage vendors that allow a user to order ahead, amenity information server 130 may select and/or sort vendors for which amenity information is to display based on the crowdedness of the various food or beverage vendors in venue 202 or the distance of the vendors from the mobile computing device making the request, or both. For example, amenity information server 130 may choose to display closer vendors before further vendors and less crowded vendors before crowded vendors.

In some embodiments, the menu items shown may not be ordered ahead but may otherwise be purchased from the corresponding amenity, such as by providing a credit card at the location of the corresponding amenity. In some embodiments, the items depicted in the displayed amenity information may be merchandise other than food or beverage, such as clothing or other goods that may be purchased.

In other embodiments, different or additional types of amenity information may display at a mobile computing device. For example, the displayed amenity information may include contact information for the amenity, user reviews of the amenity, or user recommendations of items or services available at the amenity. The displayed amenity information may indicate whether certain facilities are available at the amenity. For example, the amenity information for a restroom may indicate whether there is a baby changing station at the restroom.

The amenity information may include an estimated wait time for an amenity determined based on the crowdedness of the amenity. For example, an estimated wait time displayed in association with amenity information 404 may indicate the amount of time a user would have to wait upon arriving at Gridiron Grill to place his order or receive his order.

In an embodiment, location information for each of the entities is displayed on a single map of the venue. Locations of the map corresponding to one or more amenities may be annotated with an indication of the crowdedness of the amenity. For example, text or a symbol representing the crowdedness of a restroom may be overlaid upon a location of the map that corresponds to the location of the restroom in the venue. In such an embodiment, a user may quickly determine the estimated wait times at all the amenities in venue 202 by viewing the map. The current location of the user's mobile computing device may also be indicated on the map, thus allowing a user to select an amenity that is both relatively empty and close to the user.

A user may request amenity information for a specific type of amenity. For example, a user may request that only restrooms amenities be highlighted upon the map.

In some embodiments, in response to a user selecting a particular amenity, such as by tapping or clicking on the title of the amenity in the graphical interface of FIG. 4, a graphical interface that allows a user to place an order for pickup with the corresponding amenity may be displayed.

Amenity information including crowdedness information for an amenity may be displayed in association with information relating to an order for an item from the amenity. In response to a user placing the order using a mobile computing device, an amenity information application on the mobile computing device may send order details provided by user to amenity information server 130 and may, in response, receive order information for display. The order information may include order confirmation details such as total amount paid or a summary of the item(s) ordered. The order confirmation details and/or pickup instructions may display in association with an indicator of the crowdedness of the amenity with which the order was placed. After receiving confirmation of an order for an item from an amenity, a user may review the crowdedness level of the amenity at different times during the event to determine the best time to pick up his order.

In one embodiment, in response to receiving details of a new order from a mobile computing device, amenity information server 130 generates a Quick Response (QR) code that encodes information about the order such as, but not limited to, the items ordered, the time of order, and whether the order was paid for. A user may show the received QR code to a staff member of the amenity at the time the ordered item is received. For example, for an amenity that allows a user to order ahead before picking up the order, the user may show the QR code to an amenity staff member when picking up the order from the amenity. The QR code may be scanned by a computing system associated with the amenity, and may indicate the items ordered to the staff. In an embodiment, payment information such as a credit card number is received during the time of payment and the payment transaction may be initiated by a computing system associated with an amenity in response to the scanning of the QR code. An amenity information application may cause an indication of the crowdedness of the amenity with which the order was placed to display with the QR code at the mobile computing device with which the order was placed.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
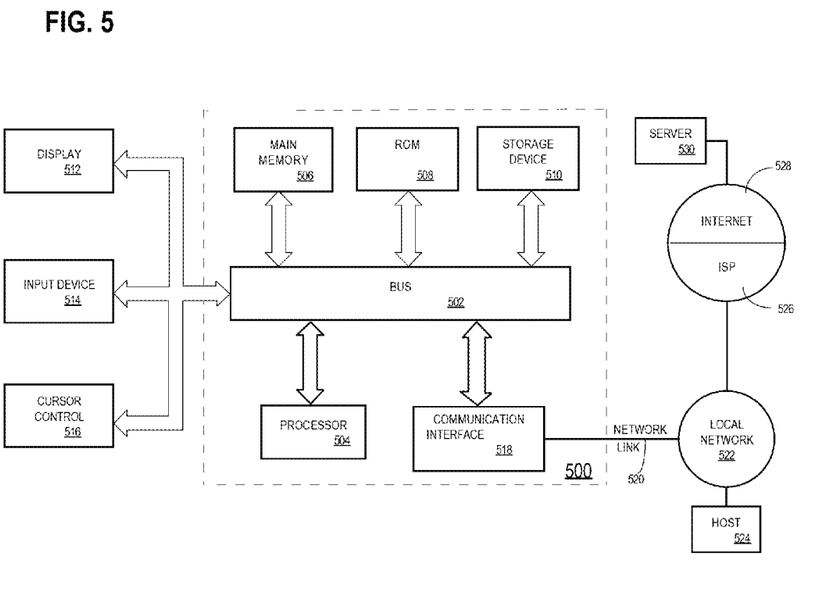
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   storing amenity service point data specifying, for a plurality of amenities in a venue, a respective plurality of different geographic points at which the amenities are located within the venue;
   determining locations of a plurality of mobile computing devices that are within the venue;
   determining, for each particular amenity among the plurality of amenities, a crowdedness level of the particular amenity based in part on the locations of the plurality of mobile computing devices relative to the geographic point corresponding to the particular amenity;
   receiving a request to view information relating to a certain amenity;
   causing display of particular information relating to the certain amenity, wherein the information includes an indication of the crowdedness level of the certain amenity
   periodically re-determining the crowdedness level of the certain amenity during a duration of an event at the venue;
   determining the locations of the plurality of mobile computing devices that are within the venue based in part upon:

mapping of device identifier values to wireless access point identifiers of a plurality of wireless access points, and access point location data that specifies fixed points in the venue at which the wireless access points are located;

determining, for each particular amenity among the plurality of amenities, the crowdedness level of the particular amenity based in part upon a number of mobile computing devices that are associated with a particular set of the wireless access points that are near to the geographic point corresponding to the particular amenity.

2. The computer-implemented method of claim 1, wherein determining the crowdedness level of the particular amenity comprises comparing a number of devices that are near the geographic point corresponding to the particular amenity with a threshold number of devices that are associated with a particular crowdedness level.

3. The computer-implemented method of claim 2, wherein the threshold number of devices associated with the particular crowdedness level is determined based at least in part on a size of the particular amenity.

4. The computer-implemented method of claim 2, wherein the threshold number of devices associated with the particular crowdedness level is determined based at least in part on a number of staff associated with the particular amenity.

5. The computer-implemented method of claim 1, wherein the particular amenity is a restroom or washroom.

6. The computer-implemented method of claim 1, wherein causing display of particular information relating to the particular amenity comprises:

causing display of the indication of the crowdedness level of the particular amenity in association with food or beverage menu items provided by the particular amenity.

7. The computer-implemented method of claim 1, wherein causing display of particular information relating to the particular amenity further comprises:

causing display of the indication of the crowdedness level of the particular amenity in association with a visual indication of a location of the particular amenity relative to a location associated with a mobile computing device of the plurality of mobile computing devices.

8. The computer-implemented method of claim 1, wherein causing display of particular information relating to the particular amenity further comprises:

causing display of the indication of the crowdedness level of the particular amenity in association with an indication of a distance between the particular amenity and a location associated with a mobile computing device of the plurality of mobile computing devices.

9. The computer-implemented method of claim 1, further comprising:

receiving an order for a concession offered by the particular amenity;

wherein causing display of particular information relating to the particular amenity comprises:

in response to receiving the order, displaying information relating to the order in association with the indication of the crowdedness level of the particular amenity.

10. The computer-implemented method of claim 1, wherein receiving the request to view information relating to the particular amenity comprises receiving a request to view information relating to a particular category of amenities at the venue.

11. One or more non-transitory storage media storing instructions which, when executed by one or more computing devices, cause the following method to be performed:

storing amenity service point data specifying, for a plurality of amenities in a venue, a respective plurality of different geographic points at which the amenities are located within the venue;

determining locations of a plurality of mobile computing devices that are within the venue;

determining, for each particular amenity among the plurality of amenities, a crowdedness level of the particular amenity based in part on the locations of the plurality of mobile computing devices relative to the geographic point corresponding to the particular amenity;

receiving a request to view information relating to a certain amenity;

causing display of particular information relating to the certain amenity, wherein the information includes an indication of the crowdedness level of the certain amenity periodically re-determining the crowdedness level of the certain amenity during a duration of an event at the venue;

determining the locations of the plurality of mobile computing devices that are within the venue based in part upon:

mapping of device identifier values to wireless access point identifiers of a plurality of wireless access points, and access point location data that specifies fixed points in the venue at which the wireless access points are located;

determining, for each particular amenity among the plurality of amenities, the crowdedness level of the particular amenity based in part upon a number of mobile computing devices that are associated with a particular set of the wireless access points that are near to the geographic point corresponding to the particular amenity.

12. The non-transitory storage media of claim 11, wherein determining the crowdedness level of the particular amenity comprises comparing a number of devices that are near the geographic point corresponding to the particular amenity with a threshold number of devices that are associated with a particular crowdedness level.

13. The non-transitory storage media of claim 12, wherein the threshold number of devices associated with the particular crowdedness level is determined based at least in part on a size of the particular amenity.

14. The non-transitory storage media of claim 12, wherein the threshold number of devices associated with the particular crowdedness level is determined based at least in part on a number of staff associated with the particular amenity.

15. The non-transitory storage media of claim 11, wherein the particular amenity is a restroom or washroom.

16. The non-transitory storage media of claim 11, wherein causing display of particular information relating to the particular amenity comprises:

causing display of the indication of the crowdedness level of the particular amenity in association with food or beverage menu items provided by the particular amenity.

17. The non-transitory storage media of claim 11, wherein causing display of particular information relating to the particular amenity further comprises:

causing display of the indication of the crowdedness level of the particular amenity in association with a visual indication of a location of the particular amenity relative to a location associated with a mobile computing device of the plurality of mobile computing devices.

18. The non-transitory storage media of claim 11, wherein causing display of particular information relating to the particular amenity further comprises:
   causing display of the indication of the crowdedness level of the particular amenity in association with an indication of a distance between the particular amenity and a location associated with a mobile computing device of the plurality of mobile computing devices.

19. The non-transitory storage media of claim 11, wherein the instructions which, when executed by one or more computing devices, further cause:
   receiving an order for a concession offered by the particular amenity;
   in response to receiving the order, displaying information relating to the order in association with the indication of the crowdedness level of the particular amenity.

20. The non-transitory storage media of claim 11, wherein receiving the request to view information relating to the particular amenity comprises receiving a request to view information relating to a particular category of amenities at the venue.

* * * * *